Dec. 15, 1953  T. P. SMITH  2,662,731
CABLE PULLING ATTACHMENT FOR VEHICLE WHEELS
Filed Oct. 20, 1952  3 Sheets-Sheet 1
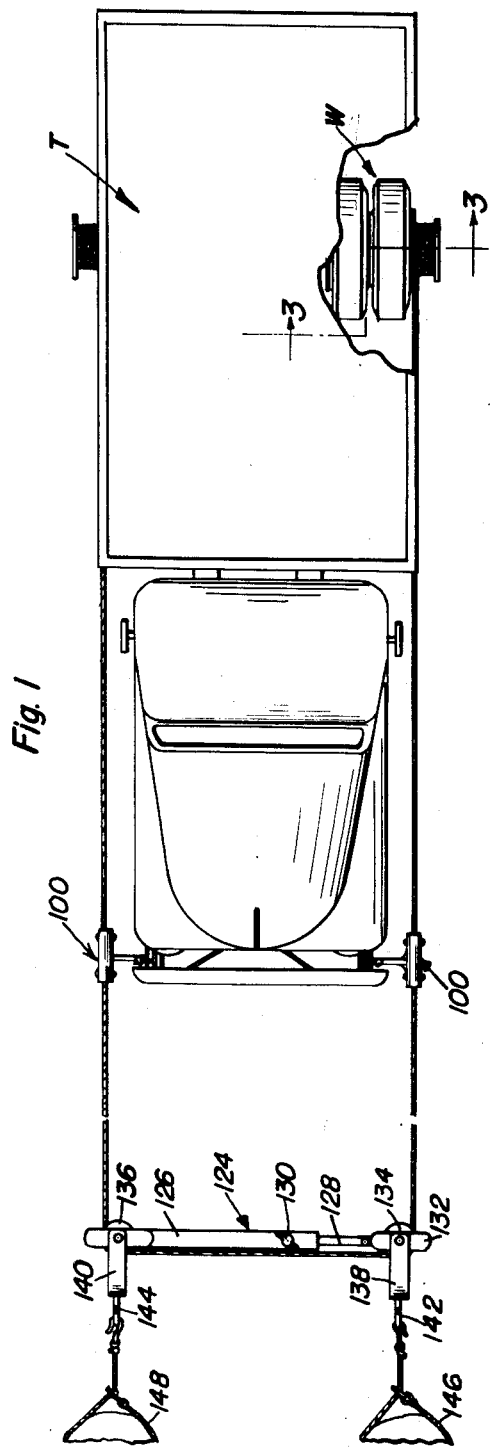
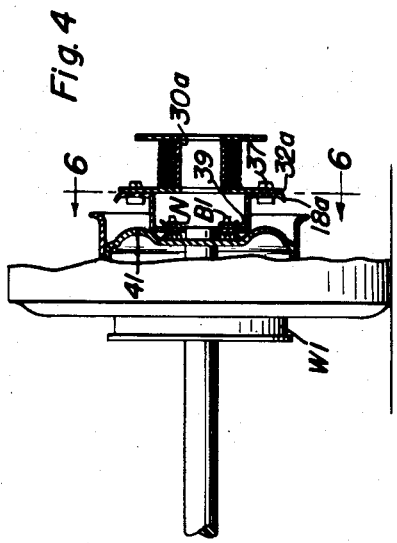
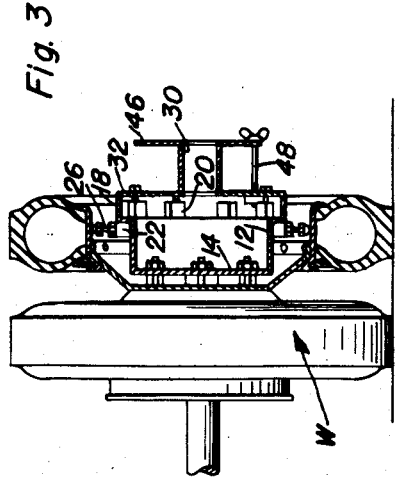
Thomas P. Smith
INVENTOR.

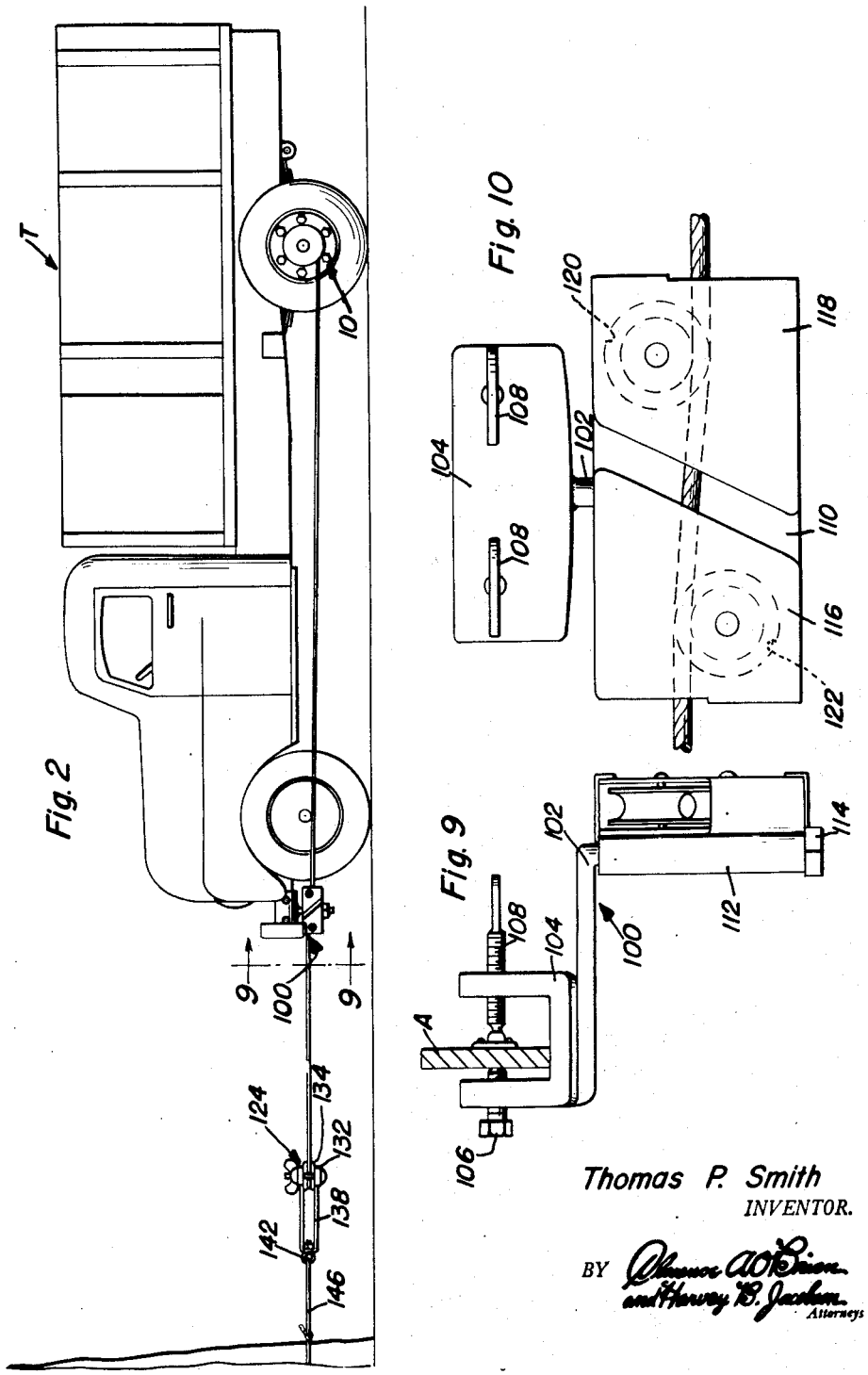

Dec. 15, 1953  T. P. SMITH  2,662,731
CABLE PULLING ATTACHMENT FOR VEHICLE WHEELS
Filed Oct. 20, 1952  3 Sheets-Sheet 3

Thomas P. Smith
INVENTOR.

Patented Dec. 15, 1953

2,662,731

UNITED STATES PATENT OFFICE 2,662,731

CABLE PULLING ATTACHMENT FOR VEHICLE WHEELS

Thomas P. Smith, Manistique, Mich.

Application October 20, 1952, Serial No. 315,622

3 Claims. (Cl. 254—166)

1

This invention relates to new and useful improvements in hauling and towing apparatus and the primary object of the present invention is to provide a cable pulling attachment for vehicle wheels involving cable drums attached to driving wheels of a vehicle so that the power plant of the vehicle will be employed for winding a cable on the drums.

Another important object of the present invention is to provide a cable pulling attachment for vehicle wheels including cable drums and novel and improved means for removably securing the cable drums on the driving wheels of a vehicle.

A further object of the present invention is to provide a cable pulling attachment composed of bumper mounted guide units that are clampingly secured to the front bumper supporting arms of a vehicle and which carry guide pulleys over which a cable from the drums is extended.

A still further aim of the present invention is to provide a cable pulling attachment that is extremely simple and practical in construction, strong and reliable in use, small and compact in structure, efficient and durable in operation, and otherwise well adapted for the purpose for which the same is intended.

Other objects and advantages reside in the details of construction and operation as more fully hereinafter described and claimed, references being had to the accompanying drawings forming part hereof, wherein like numerals refer to like parts throughout, and in which:

Figure 1 is a plan view of a vehicle and showing the invention applied thereto and with part of the vehicle broken away for the convenience of explanation;

Figure 2 is a side elevational view of Figure 1;

Figure 3 is an enlarged vertical sectional view taken substantially on the plane of section line 3—3 of Figure 1;

Figure 4 is a view similar to Figure 3 but showing the cable drum in modified form attached to a vehicle having a single pair of driving wheels;

2

Figure 7:
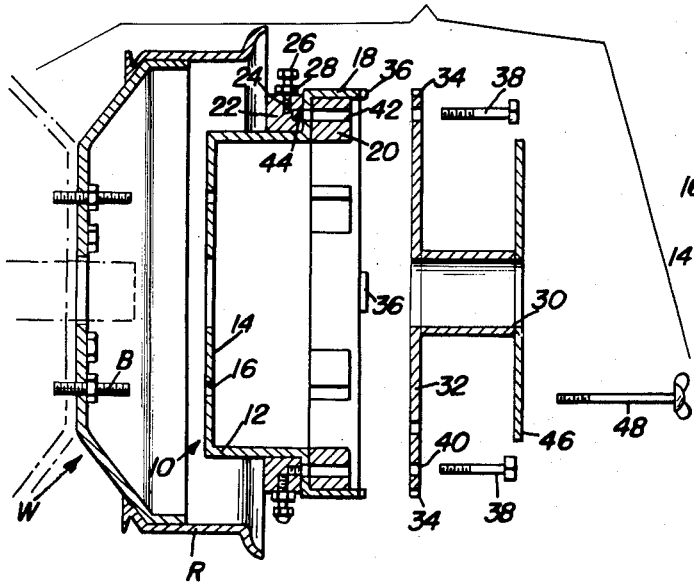
Figure 7 is an enlarged group view of Figure 3 and showing the cable drum and its mounting means spaced from each other and the driving wheel.
Figure 8:
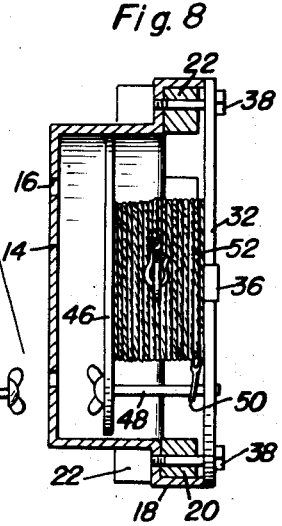

Figure 8 is a view similar to Figure 7 but showing the cable drum positioned within the mounting means when the same is not being used;

Figure 9 is an enlarged vertical sectional view taken substantially on the plane of section line 9—9 of Figure 2; and Figure 10 is a side view of Figure 9.

Referring now to the drawings in detail, wherein for the purpose of illustration, there is disclosed a preferred embodiment of the present invention, the numeral 10 represents a cable winding unit that is specifically designed for use with a vehicle or truck T having dual rear driving wheels W.

One unit 10 is attached to the outer rim R of each dual wheel W. Each unit 10 comprises a rigid cup element 12 whose end wall 14 is formed with apertures 16 for receiving bolts B that form part of the dual wheels. Nuts N are threaded on the bolts B to secure the cup elements to the wheels W.

The cup elements 12 are provided with radially offset open end portions 18 to which spacer blocks 20 are fixedly secured. A reinforcing and strengthening ring 22 is fixed to the outer periphery of each cup 12. Rings 22 are formed with circumferentially spaced, internally threaded radial apertures 24 that receivably engage retaining bolts 26 having lock nuts 28 thereon. The bolts 26 are adjusted radially outward to engage the rims R.

Cable drums 30 constitute portions of the units 10 and include inner flanges 32 that will enter portions 18. Flanges 32 are formed with circumferentially spaced centering slots 34 that receive circumferentially spaced spacer lugs 36 on the cup elements. Bolts 38 extend through apertures 40 in the flanges 32, bores 42 in the blocks 20 and are threaded in recesses 44 in the rings 22.

When the drums 30 are not being used, the smaller outer flanges 46 of the drums are placed within the cup elements 12 and the fasteners 38 are extended through the apertures 40, bores 42 and are again threaded in the recesses 44. A bolt 48 is carried by the flanges 32 and 46 of each drum and these bolts provide anchors for the hooks 50 of cables 52 that are wound on the drums.

Figure 5:
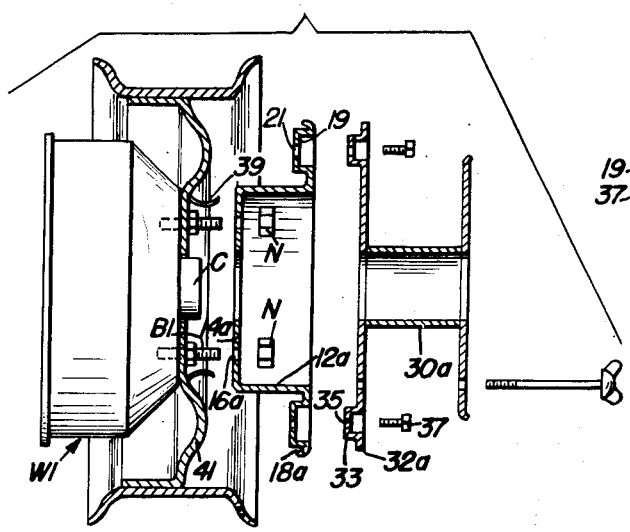
Figure 5 is an enlarged group view of Figure 4 showing the cable drum and its mounting means spaced from each other and also spaced from the driving wheel.
Figure 6:
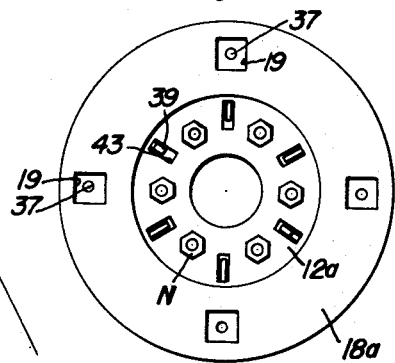
Figure 6 is an enlarged sectional view taken substantially on the plane of section line 6—6 of Figure 4.

Figures 4, 5 and 6 show the invention modified for use with a single pair of driving wheels W¹. The cup elements 12a are provided with flanges 18a at their open ends that are depressed to form channels or wells 19 having circumferentially spaced apertures 21. The end walls 14a of the cup elements are formed with apertures 16a that receive bolts B¹ secure the cup elements to the wheels. The walls 14a are formed with central openings that will receive the usual grease caps C of the wheels W¹.

The cable drums 30a are similar to the drums 30 and their inner flanges 32a are provided with annular series of lugs or ribs 33 that enter the channels 19 so that flanges 32a will rest against the flanges 18a. Apertures 35 in the channels 19 receive bolts 37 which are threaded in the apertures 21.

Centering spring fingers 39 fixed to the wheel plates 41 enter circumferentially spaced slots 43 in the end walls 14a to center the apertures 16a with the bolts B¹ as the cup elements are secured to the wheels W¹.

Cable guide means is provided for the cables that are wound on the cable winding units. The guide means 100 comprises a pair of L-shaped rod elements 102 whose horizontal legs are fixed to the undersides of channels 104. The flanges of the channels 104 are formed with threaded apertures that receivably engage clamp screws 106 and 108 coact to clampingly engage the bumper supporting arms A of the truck T.

Roller supporting casings 110 are provided with vertical sleeves 112 on their inner walls that receive the vertical legs of the rod elements 102. Nuts 114 are threaded on the lower ends of the vertical legs of rod elements 102. Nuts 114 are threaded on the lower ends of the vertical legs of rod elements 102 and force the sleeves 112 against the horizontal legs of the rod elements 102.

The outer side walls of casings 110 are composed of spaced sections 116 and 118 so that a cable may be passed therebetween to engage under rear rollers 120 carried by walls 110 and sections 118 and over forward rollers 122 carried by walls 110 and sections 116.

A drawbar 124 is disposed transversely of and in front of the truck T and comprises a tubular member 126 having a rod 128 slidably received in one of its ends. A set screw 130 carried by tubular member 126 engages rod 128 to adjust the rod 128 longitudinally within the tubular member.

A bifurcated member 132 is secured to the outer end of rod 128 and supports a pulley 134 over which the cable from one of the units 100 is engaged. The bifurcated end of tubular member 126 also supports a pulley 136 that engages this cable.

U-shaped brackets 138 and 140 are pivotally attached to the pulley supporting portions of drawbar 124 and fixedly support hooks or eyes 142 and 144 that are engaged with hooks of embracing cables or ropes 146 and 148, the latter being engaged with a stuck vehicle or a stationary object such as trees in the event the truck T is stuck in soft terrain or the like.

Having described the invention, what is claimed as new is:

1. In a vehicle having rear driving wheels and front bumper mounting arms; a cable pulling attachment for the vehicle comprising a pair of cable drums removably secured to the rear wheels, a pair of cable guide units, means removably securing the guide units to said arms, and a cable terminally attached to said drums and extending through said guide units, each of said cable drums including an inner flange, rigid cup elements secured to the rims of the driving wheels, and means securing the inner flanges of said drums to said cup elements, and radially adjustable fastening means carried by said cup elements engaging the rims of said driving wheels.

2. In a vehicle having rear driving wheels and front bumper mounting arms; a cable pulling attachment for the vehicle comprising a pair of cable drums removably secured to the rear wheels, a pair of cable guide units, means removably securing the guide units to said arms, and a cable terminally attached to said drums and extending through said guide units, each of said cable drums including an inner flange, rigid cup elements secured to the rims of the driving wheels, said cup elements having radially offset outer portions receiving the inner flanges therein, spacer blocks fixed to and disposed within said offset portions, and fasteners extending through said inner flanges and threaded into said blocks.

3. In a vehicle having rear driving wheels and front bumper mounting arms; a cable pulling attachment for the vehicle comprising a pair of cable guide units, means removably securing the guide units to said arms, and a cable terminally attached to said drums and extending through said guide units, each of said cable drums including an inner flange, rigid cup elements secured to the rims of the driving wheels, said cup elements having radially offset outer portions receiving the inner flanges therein, an annular rib on each inner flange received in said offset outer portions, and fasteners extending through said ribs and threaded to said offset outer portions.

THOMAS P. SMITH.

References Cited in the file of this patent

UNITED STATES PATENTS

| Number | Name | Date |
|---|---|---|
| 1,308,874 | Stauffer | July 8, 1919 |
| 2,240,570 | Oesterheld | May 6, 1941 |
| 2,377,881 | Haus | June 12, 1945 |

FOREIGN PATENTS

| Number | Country | Date |
|---|---|---|
| 2,170 | Australia | Mar. 10, 1927 |